United States Patent [19]

Stütz et al.

[11] Patent Number: 5,011,185
[45] Date of Patent: Apr. 30, 1991

[54] LOCKING MEANS FOR A DRIVE MEMBER OF A PASSIVE SAFETY-BELT SYSTEM

[75] Inventors: Michael Stütz, Spraitbach; Thomas Mödinger, Vordersteinenberg, both of Fed. Rep. of Germany

[73] Assignee: TRW Repa GmbH, Fed. Rep. of Germany

[21] Appl. No.: 401,052

[22] Filed: Aug. 31, 1989

[30] Foreign Application Priority Data

Sep. 6, 1988 [DE] Fed. Rep. of Germany ....... 3830288

[51] Int. Cl.$^5$ ..................... B60R 22/06; B60R 22/24
[52] U.S. Cl. ..................................... 280/804; 280/808
[58] Field of Search ..................... 280/802, 804, 808

[56] References Cited

U.S. PATENT DOCUMENTS

| | | | |
|---|---|---|---|
| 4,369,990 | 1/1983 | Takada | 280/804 |
| 4,573,709 | 3/1986 | Kawai et al. | 280/804 |
| 4,647,070 | 3/1987 | Yamamoto et al. | 280/804 |
| 4,750,758 | 6/1988 | Yamamoto et al. | 208/804 |

FOREIGN PATENT DOCUMENTS

| | | |
|---|---|---|
| 2821151 | 11/1979 | Fed. Rep. of Germany . |
| 3105480 | 9/1982 | Fed. Rep. of Germany . |
| 3334354 | 5/1985 | Fed. Rep. of Germany . |

*Primary Examiner*—Kenneth R. Rice
*Attorney, Agent, or Firm*—Tarolli, Sundheim & Covell

[57] ABSTRACT

The locking means for the drive member of a passive safety-belt system includes a pivotally mounted ratchet hook which secures the drive member in its end position corresponding to the belt fastening position. The ratchet hook is arranged on the side of the drive member to which the tensile force occurring at the drive member is directed under accident load. The nose of the ratchet hook dips into a recess at the upper edge of the drive member. Even after high accident stress due to a head-on collision, in which deformation of the loaded parts occurs, the ratchet hook remains reliably in engagement with the drive member.

1 Claim, 2 Drawing Sheets

LOCKING MEANS FOR A DRIVE MEMBER OF A PASSIVE SAFETY-BELT SYSTEM

The invention relates to a locking means for a drive member, movable in a guide between a belt securing position and a belt stowing position, of a passive safety-belt system comprising a pivotally mounted ratchet hook which in the belt fastening position of the drive member engages the latter.

In a passive safety-belt system the upper end of the shoulder belt is secured to a drive member which is guided in a guide rail by any desired drive means between two end positions. The one front end position corresponds to the belt stowing position which permits a substantially unobstructed climbing into and alighting from a vehicle. The other end position corresponds to the belt fastening position in which the upper end of the shoulder belt is just above the shoulder region of the vehicle occupant. In this position the drive member is secured by a stop against downward movement. To prevent the drive member leaving its end position corresponding to the belt fastening position when the vehicle rolls over or in a complex accident process, in the known locking means of this type a pivotal spring-loaded ratchet hook engages behind the drive member at its edge remote from the stop. Only after release of this ratchet hook by a suitable control mechanism can the drive member be moved out of its end position.

Under high accident stress deformation of the load-bearing parts of a safety-belt system is inevitable to a certain extent. In a passive safety-belt system this also applies to the drive member and the support and stop elements associated therewith.

The present invention provides a locking means of the type set forth above and wherein even after a high accident stress in which a considerable deformation of the loadbearing parts occurs the securing of the drive member in its end position corresponding to the belt fastening position by means of the ratchet hook is ensured, so that in a subsequent overturning of the vehicle the upper end of the shoulder belt remains in the optimum fastening position.

This problem is achieved according to the invention in a locking means of the type set forth above and wherein the ratchet hook is arranged on the side of the drive member to which the tensile force occurring at the drive member on accident stressing of the safety-belt system is directed. With the locking means according to the invention, in the stress case, that is for example on a collision of the vehicle with an obstacle, if a high tensile force acts on the drive member via the webbing and the end fitting thereof, then said member and the parts supporting it secured to the vehicle bodywork can deform to a certain extent. On such deformation, however, the drive member cannot be removed from the ratchet hook because the deformation direction is the same direction in which the ratchet hook is disposed.

Consequently, when the drive member deforms it will do so towards the ratchet hook. On strong deformation of the drive member the latter will even bear on the ratchet hook and be additionally supported thereby and this can be advantageously taken into account in the dimensioning of the components. Even after an extremely high accident stressing the ratchet hook will not have become detached from the drive member so that in any possible turnover the drive member and consequently the upper anchoring point of the shoulder belt remains in its prescribed position.

According to an advantageous further development of the invention the drive member is provided on its side facing the ratchet hook with a recess into which the nose of the ratchet hook dips to lock the drive member. This recess may contribute to a considerable extent to the effect that after high accident stress in which the drive member and the parts supporting it have become relatively greatly deformed the ratchet hook continues to remain in engagement with the drive member to secure the latter in its position for any possible subsequent overturning. For the nose of the ratchet hook will bear on the boundary wall of the recess opposite said nose and support the drive member also in lateral direction, a bending of the ratchet hook not only being of no detrimental effect but even being utilized to cause the nose of the ratchet hook to follow the deformation of the drive member.

An advantageous further development of this embodiment resides in that the recess of the drive member is made rectangular in plan view and comprises two parallel boundary walls which are perpendicular to the pivot axis of the ratchet hook and the spacing of which apart is appreciably greater than the width of the ratchet hook measured in the direction of said spacing. Due to this dimensioning of the recess the side faces of the nose of the ratchet hook which has dropped into the recess remain spaced from said boundary walls, preventing any rattling noises.

Furthermore, in the preferred embodiment the recess is open towards the side of the drive member which is remote from the pivot axis of the ratchet hook. This construction achieves that the head piece of the ratchet hook can be dimensioned in optimum manner because it can project at the open side of the recess out of the latter.

Further features and advantages of the invention will be apparent from the following description of an embodiment and the drawings to which reference is made and wherein.

Figure 1:
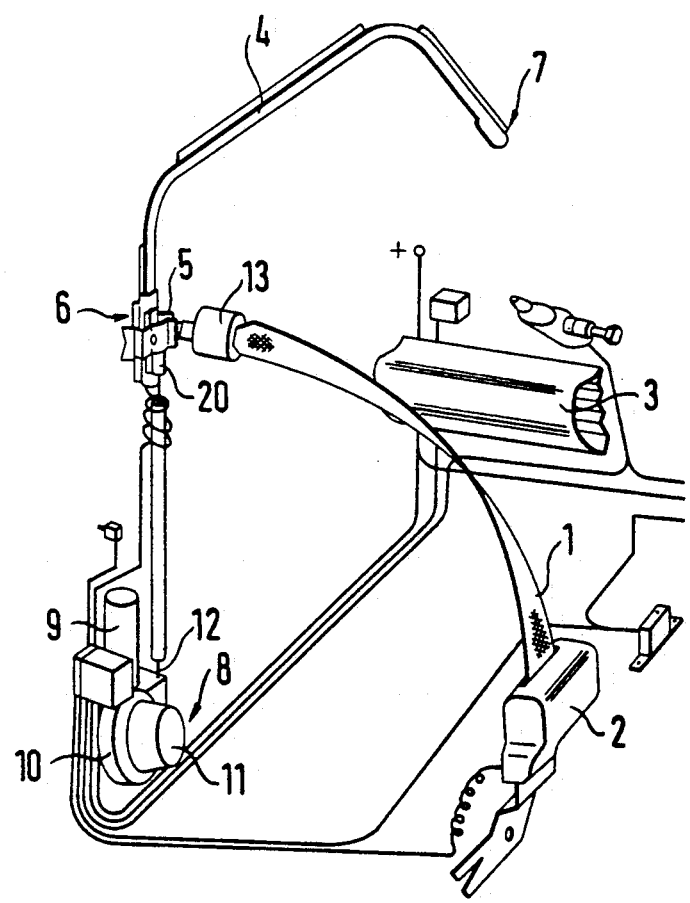
FIG. 1 is a schematic representation of the basic components of a passive safety-belt system in a motor vehicle.

A passive safety-belt system of the type shown in FIG. 1 consists of a shoulder belt 1, a belt retractor 2 anchored to the vehicle bodywork, a knee cushion 3 disposed in front of the seat, a guide rail 4 in which a drive member 5 is guided between two end positions 6, 7, and a drive system 8 for the drive member 5. Said drive system 8 consists of an electric motor 9, a reduction gearing 10, a drum 11 driven via said reduction gearing by the electric motor 9 and a tension-rigid and pressure-rigid cable 12, the free end of which engages the end of the drive member 5 and which is wound onto and off of the drum 11. In the end position 6 which corresponds to the belt fastening position the drive member 5 is secured by a locking means 20. The upper end of the shoulder belt 1 is secured via a fitting 13 to the drive member 5.

Since such a passive safety-belt system is known (for example from German specification as laid open to inspection 3,136,336) a further description thereof would be superfluous.

The locking means 20 will now be described with reference to FIGS. 2 to 4.

The displacement travel of the drive member 5 in a housing 22 secured to the vehicle terminates at the bottom 24 of a slot-like recess 26 which is widened slightly towards the outer side of the housing 22. In its end position corresponding to the belt fastening position the drive member 5 bears on said bottom 24. In the housing 22 a ratchet hook 28 is mounted pivotally about an axis 30. The ratchet hook 28 comprises a nose 32 which forms the free end of the ratchet hook 28.

Figure 2:
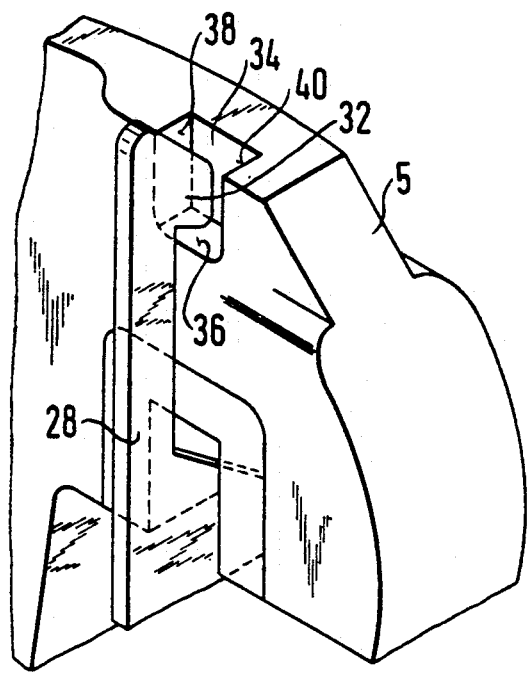
FIG. 2 is a schematic perspective representation of a locking means for the passive safety-belt system.
Figure 3:
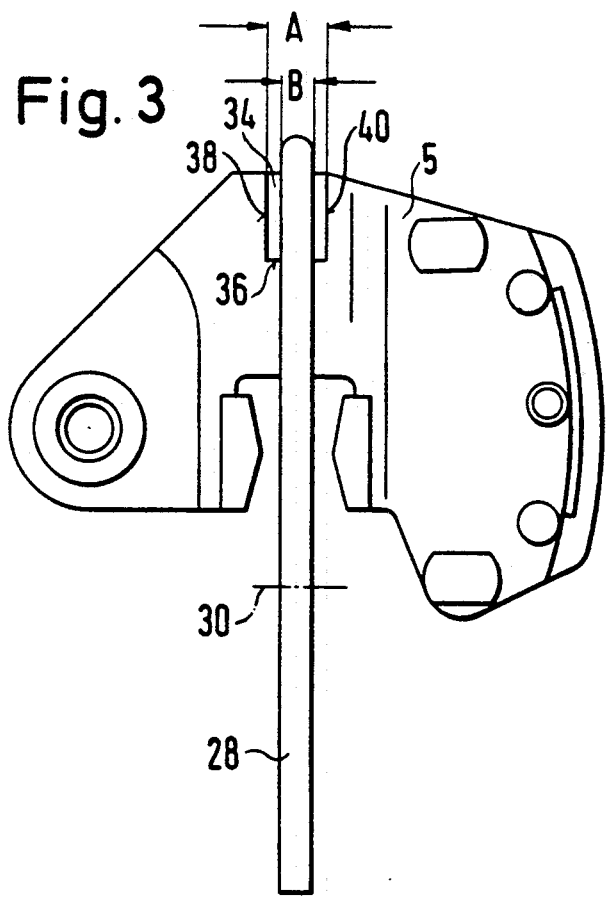
FIG. 3 is a plan view of the drive member and the rear side of the ratchet hook in engagement therewith.

As best apparent from FIG. 2 the drive member 5 comprises at its edge remote from the axis 30 a recess 34 into which the nose 32 of the ratchet hook 28 drops under the action of a spring (not shown). The recess 34 is open at its side remote from the axis 30 so that the headpiece of the ratchet hook 28 which forms the nose 32 can project out of the recess 34 on side. The opposite side of the recess 34 forms a detent edge 36 on which the face of the nose 32 of the ratchet 28 opposite said edge engages. The two parallel side walls 38, 40 of the recess 34 lie as apparent from FIG. 3 a distance A apart which is considerably greater than the width B of the ratchet hook 28 measured in the direction of said distance A. The spacing A is preferably about twice as great as the width B of the ratchet hook 28. Due to this shaping and dimensioning of the recess 34 all the surfaces of the ratchet hook 28, and in particular its nose 32, remain a slight distance from the respective opposing surfaces of the recess 34 and consequently rattling noises are avoided with certainty.

Figure 4:
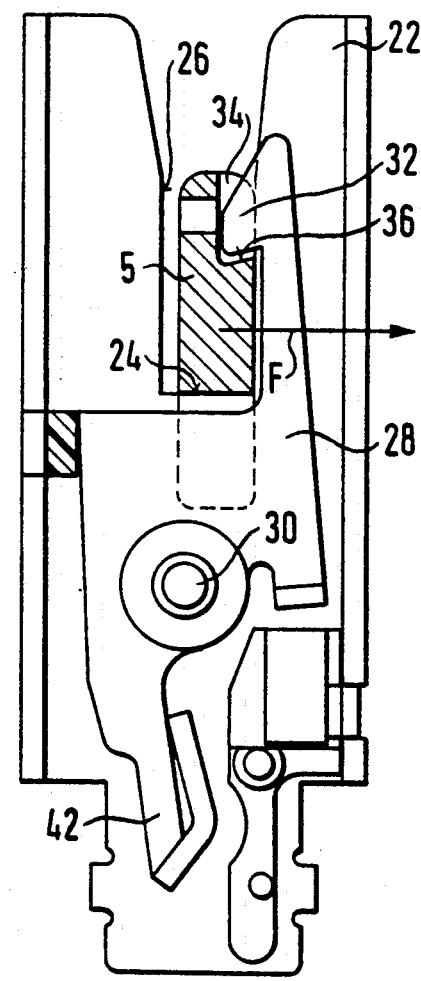
FIG. 4 is a partially sectioned side view of the locking means.

In FIG. 4 an arrow F indicates the tensile force which under accident stress acts on the drive member 5 via the shoulder belt 1 and the fitting 13 thereof. As further apparent from FIG. 4 the ratchet hook 28 lies opposite the drive member 5 in the direction of said arrow F. Under the action of the tensile force F the drive member 5 and the housing 22 supporting it can be deformed to a certain extent. However, when this is done the drive member 5 moves closer to the ratchet hook 28 so that the nose 32 of the ratchet hook 28 remains in engagement with the recess 34 of the drive member 5. On pronounced deformation of the parts the drive member 5 can also bear on the face of the ratchet hook 28 opposite said member.

The direction of the tensile force F depends of course on the particular accident situation. In a typical collision accident the tensile force F is directed approximately in the direction of travel and slightly inclined downwardly. This is the case to which the aforementioned definitions regarding the arrangement of the ratchet hook 28 relatively to the drive member 5 relates.

In a complex accident situation tensile forces will occur at the drive member 5 which also have lateral components which can lead to a side face of the ratchet hook 28 in the region of the nose 32 coming to bear on a side wall 38 or 40 of the recess 34 and being supported thereby. The nose 32 of the ratchet hook 28 thus cannot come out of the recess 34. Under extremely high load the ratchet hook 28 can even be bent in lateral direction and can thus follow the deformation of the drive member 5, the nose 32 thereof thus remaining engaged in the recess 34.

The ratchet hook 28 comprises an actuating arm 42 at its end remote from the nose 32. To release the ratchet hook 28 from the drive member 5 a pressure is exerted on said actuating arm 42 by a release element (not shown) so that said arm 42 is pivoted clockwise in FIG. 4, the nose 32 thereby being lifted out of the recess 34 and the drive member 5 is able to move out of the slot 26.

We claim:

1. In a passive safety belt system for vehicles, comprising:

a guide member secured on a vehicle bodywork, a drive member slidably mounted in said guide member and having a safety belt fitting mounted thereto, said drive member being movable along said guide member between a belt wearing position and a belt stowing position, a locking member pivotally mounted adjacent to said guide member for engaging said drive member in said belt wearing position, the improvement wherein:

said locking member is a plate-like elongated ratchet hook pivotally mounted at one end thereof about an axis and comprising at its other end a nose extending laterally from the ratchet hook in a direction substantially opposite to the direction of travel of the vehicle and perpendicular to the drive member, said ratchet hook being arranged on a side of said drive member to which tensile force occurring at said drive member upon a vehicle frontal crash is directed, said drive member comprises on a side thereof facing said ratchet hook a recess into which said nose portion of said ratchet hook dips to lock said drive member, said recess of said drive member is rectangular, as viewed in a direction opposite to the normal direction of travel of the vehicle, and comprises two parallel boundary walls which are perpendicular to the pivot axis of said ratchet hook and spaced from each other by a predetermined spacing which is substantially greater than the thickness of said plate-like ratchet hook, so that the side faces of said nose portion of said ratchet hook remain at a distance from said boundary walls when said nose portion is engaged into said recess.

* * * * *